United States Patent [19]

Degenhardt et al.

[11] 3,964,193

[45] June 22, 1976

[54] APPARATUS FOR SIMULTANEOUSLY VIEWING DIA POSITIVES AND FRONT VIEWED PICTURES

[75] Inventors: Günter Degenhardt, Heidelberg; Tino Celio, Ambri, Switzerland

[73] Assignee: Gretag Aktiengesellschaft, Regensdorf, Switzerland

[22] Filed: Dec. 23, 1974

[21] Appl. No.: 535,821

[30] Foreign Application Priority Data

June 28, 1974 Switzerland.................... 8928/74

[52] U.S. Cl. ........................ 40/106.1; 240/2 AT
[51] Int. Cl.² ...................................... G09F 13/10
[58] Field of Search............... 40/106.1, 63 A, 64 A, 40/129 A, 130 R, 132 R, 130 B, 130 F, 132 A, 152.2; 240/2 AT, 6.45 P, 6.45 R

[56] References Cited
UNITED STATES PATENTS

| 2,184,721 | 12/1939 | McIlvanie | 40/130 R X |
| 2,677,909 | 5/1954 | Heydenryk | 40/152.2 |
| 3,215,451 | 11/1965 | McCracken | 40/130 R UX |
| 3,492,486 | 1/1970 | Bischoff et al. | 40/106.1 X |
| 3,500,569 | 3/1970 | Simmons | 40/129 R X |
| 3,724,111 | 4/1973 | Grieger | 40/106.1 |
| 3,742,203 | 6/1973 | Noe | 40/152.2 |

FOREIGN PATENTS OR APPLICATIONS

| 1,372,601 | 8/1964 | France | 40/106.1 |

*Primary Examiner*—Louis G. Mancene
*Assistant Examiner*—John F. Pitrelli
*Attorney, Agent, or Firm*—Pierce, Scheffler & Parker

[57] ABSTRACT

An apparatus for simultaneously viewing diapositives and front viewed pictures or images, especially transparent printed copies and prints produced therefrom under standardized illumination conditions, comprising a rear viewing device encompassing a support for supporting a diapositive or transparent positives or images and light source means arranged behind said support through which the light can be projected. There is also provided a front viewing device comprising a support for the front viewed image or picture and light source means arranged in front of said last-mentioned support. The rear viewing device and the front viewing device are hingedly interconnected with one another and can be selectively fixed in adjustable mutual angular positions relative to one another.

3 Claims, 3 Drawing Figures

APPARATUS FOR SIMULTANEOUSLY VIEWING DIA POSITIVES AND FRONT VIEWED PICTURES

BACKGROUND OF THE INVENTION

The present invention relates to a new and improved construction of apparatus for simultaneously viewing both transparent positives or images, hereinafter conveniently broadly referred to as diapositives, and front viewed pictures.

One of the most difficult problems in the graphic arts is to appraise the quality of prints which have been produced from transparent copies. This is so owing to the different reproduction processes employed in the case of photographs and prints, especially because of the considerably greater density of the border in the case of a diapositive in relation to a printed picture image.

In order to be able to objectively appraise the comparison of printed copies and prints there have heretofore been proposed illumination standards. Such standards are set forth, for instance, in the publication of American National Standard Institute entitled "Viewing Conditions for the Appraisal of Color Quality and Color Uniformity in the Graphic Arts". However, the preconditions for the general compliance with such standards is that there be available viewing devices which satisfy these requirements and that such devices be as wide disseminated and available as possible.

Heretofore there were only known to the art separate viewing devices for handling transparent images or direct or front viewed images and which satisfied these illumination standards. However, in order to be able to simultaneously view with such devices diapositives and front viewed images or pictures the rear viewing device had to be erected in the illumination field of the front viewing device in such a manner that a portion of the light complying with the illumination standards and emanating from the front viewing device also impinged the rear viewing device. Yet since the separate rear viewing device and front viewing device generally cannot be accommodated to one another —normally they emanate from different manufacturers— the reproducability of the mutual spatial arrangement of both separate viewing devices and which is governed by such standards is not ensured for, and thus the ability to judge the quality obtained in this manner is dubious.

A further drawback, especially of the heretofore known front viewing devices, resides in the fact that such are generally designed for relatively large image or picture formats, and therefore, the equipment itself is correspondingly voluminous or bulky, and hence non-transportable i.e. must be left in place where erected. Owing to their considerable space requirements and especially because of their relatively great cost these devices are generally only suitable for use by large firms, not however for small and medium size firms, and certainly not at all by their customers.

SUMMARY OF THE INVENTION

Hence, it is a primary object of the present invention to provide an improved apparatus for simultaneously viewing diapositives and front viewed pictures which is not associated with the aforementioned drawbacks and limitations of the prior art constructions.

Another and more specific object of the present invention aims at the provision of a particularly compact and easily transportable apparatus for simultaneously viewing diapositives and front viewed pictures and wherein the spatial correlation between the portion of the equipment responsible for the rear viewing operation and the portion of the equipment responsible for the front viewing operation of such pictures or images is positively ensured for and in a readily reproducible manner.

Now in order to implement these and still further objects of the invention, which will become more readily apparent as the description proceeds, the apparatus of this development for the simultaneous viewing of diapositives and front viewed pictures, especially transparent printed copies and prints fabricated therefrom, under standardized illumination conditions, is manifested by the features that there is provided a rear viewing device equipped with a support for a diapositive and a light source or light source means arranged behind said support, a front viewing device comprising a support for a front viewed picture and a light source or light source means arranged in front of said last-mentioned support. Further, the rear viewing device and the front viewing device are hingedly interconnected with one another and can be fixed in an adjustable mutual angular position relative to one another.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
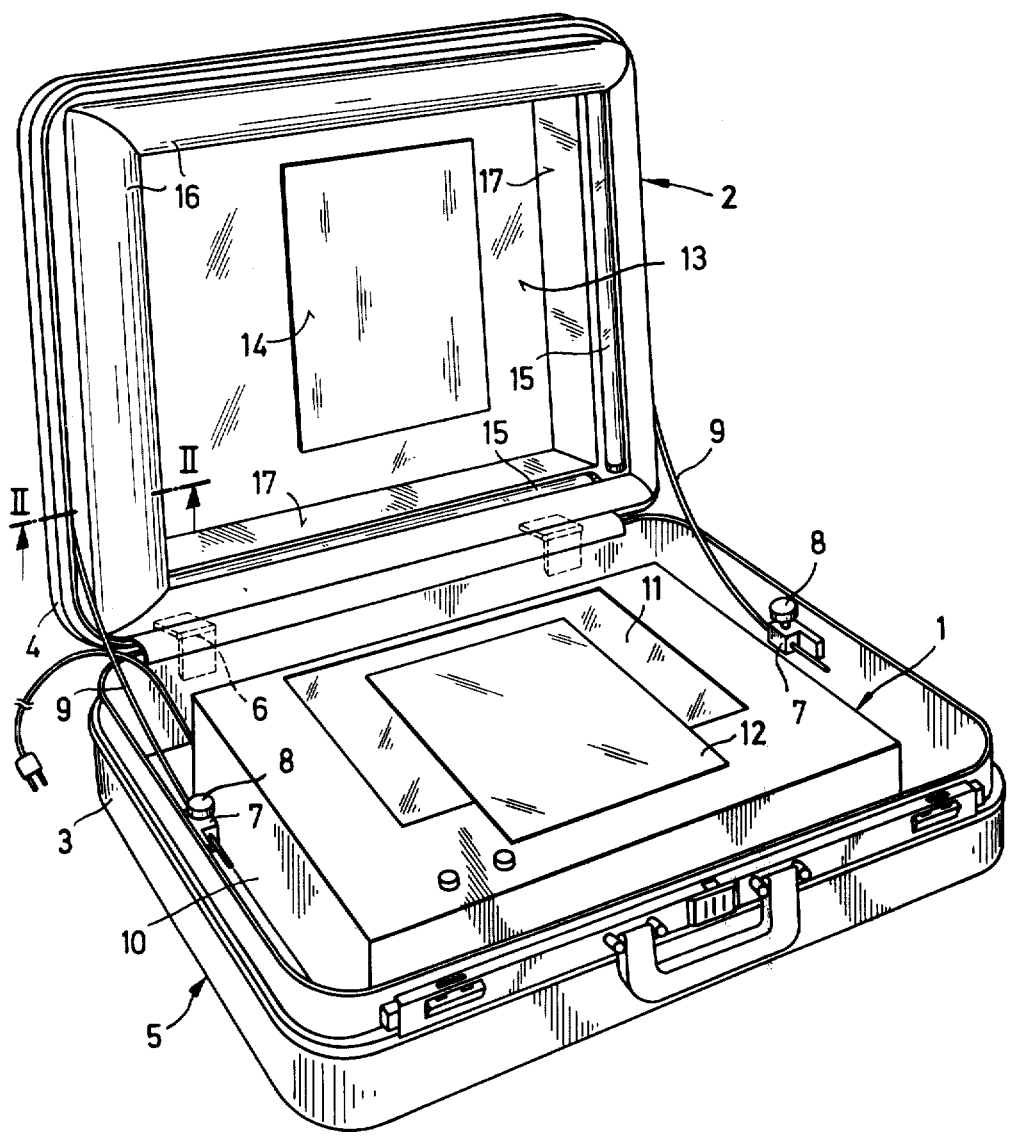
FIG. 1 is a perspective view illustrating a first exemplary embodiment of the invention.
Figure 2:
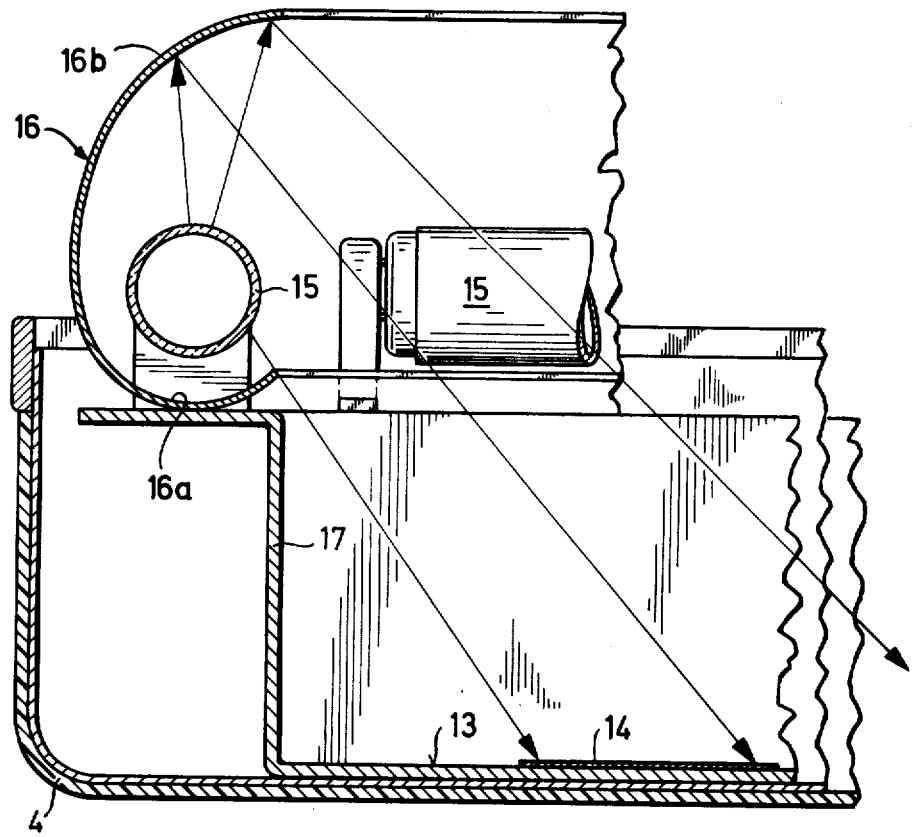
FIG. 2 is an enlarged cross-sectional view of the arrangement shown in FIG. 1, taken substantially along the line II—II thereof.

Describing now the drawings, the exemplary embodiment of apparatus depicted in FIGS. 1 and 2 will be seen to comprise a rear viewing device 1 and a front viewing device 2, here shown by way of example housed at the floor or base portion 3 and the cover portion 4 respectively of a light metal suitcase or case-like housing 5. Of course the housing 5 could be fabricated from other materials, such as plastic by way of example. Both of these portions or components 3 and 4 of the case-like housing or suitcase 5 are articulated with one another in conventional fashion by means of a suitable hinge 6 or equivalent structure. The cover portion 4 can be conveniently fixed relative to the floor portion 3 in any desired position by means of laterally arranged rods or bars 9 which are hingedly secured to the cover portion 4 and supported at the floor or base portion 3 in an associated guide member 7 equipped with a clamping screw 8 or equivalent structure.

As far as the rear viewing device 1 is concerned the same is constructed in the manner of a conventional diapositive viewing device or lantern slide projector. It embodies a light impervious casing 10 which is equipped at its top surface with a window 11 constructed as a light dispersion or scattering disk. The diapositive 12 is supported at this window 11 which therefore defines support means for the diapositive or transparent picture. Within the casing 10 there are arranged a row of substantially tubular-shaped light sources which, although not visible in the showing of FIG. 1, may be like the light sources 20 portrayed schematically in FIG. 3. The light scattering disk or window 11 and the light sources or light source means 20 are accommodated to one another in such a way that the light impinging the diapositive satisfies to the previously mentioned standards.

Continuing, it is to be understood that the front viewing device 2 which, in this instance, is shown arranged by way of example in the cover portion 4 of the suitcase or case-like housing 5 essentially consists of a substantially planar support or supporting surface 13 for the front viewed image or picture 14 which is to be judged and light source means in the form of luminescent or fluorescent tubes 15 arranged completely around the support surface 13 and located at a relatively slight elevational spacing from such support surface, as may be best understood by referring to FIG. 2. Furthermore, each luminescent tube 15 is provided with a substantially trough-shaped reflector 16 of approximately C-shape profile or cross-section, again as best seen by referring to FIG. 2. As far as the trough-shaped reflector 16 is concerned it will be seen that the same has a first portion 16a which is situated closer to the supporting surface or support 13 and a second portion 16b which is situated at a greater distance from such support 13. The first portion 16a is more markedly or extensively curved than the second portion 16b.

The reflectors 16, only one of which has been conveniently shown in FIG. 2, serve the purpose, on the one hand, of preventing direct visual access of the luminescent tubes 15 by the observer, thereby avoiding any possible momentary blinding of the observer by the light source and, on the other hand, ensure for a uniform illumination of the entire support surface 13 and the image or picture 14 which is secured or held thereon. Without the reflectors, and owing to the relatively low arrangement of the luminescent tubes 15 and the fact that they are close to the marginal region of the front viewing device 2, there would not be possible a sufficiently uniform illumination, rather the illumination or light intensity would tend to markedly decrease from the marginal region towards the center of the picture.

The reflectors 16 are secured by means of their lower curved portion 16a which is, as mentioned above, situated closer to the image support or supporting surface 13, at a frame 17. As also mentioned above, each portion 16a of the individual reflectors 16 is curved more strongly than the other portion 16b which is further removed from such support surface 13. The cross-section of the reflectors can be constituted by a portion of an ellipse or for ease in fabrication preferably can be composed of circular arcs of different radii. The luminescent tubes 15 are arranged at the more markedly curved portions 16a of the reflectors 16 which are situated closer to the support surface 13. In this way there is achieved the beneficial result that part of the light which is radiated in the direction of the support surface will be screened by the associated lower edge or curved portion of the reflectors.

Of course as should be readily understood also in the case of the front viewing device the luminescent tubes constituting the light source means and the reflection characteristics of the support surface satisfy the previously mentioned standards. The requirement that a part of the light which illuminates the front viewed image also must be capable of reaching the rear viewed image is satisfied by suitable forwardly inclining the cover of the caselike housing and therefore equally forwardly tilting the front viewing device 2.

Figure 3:
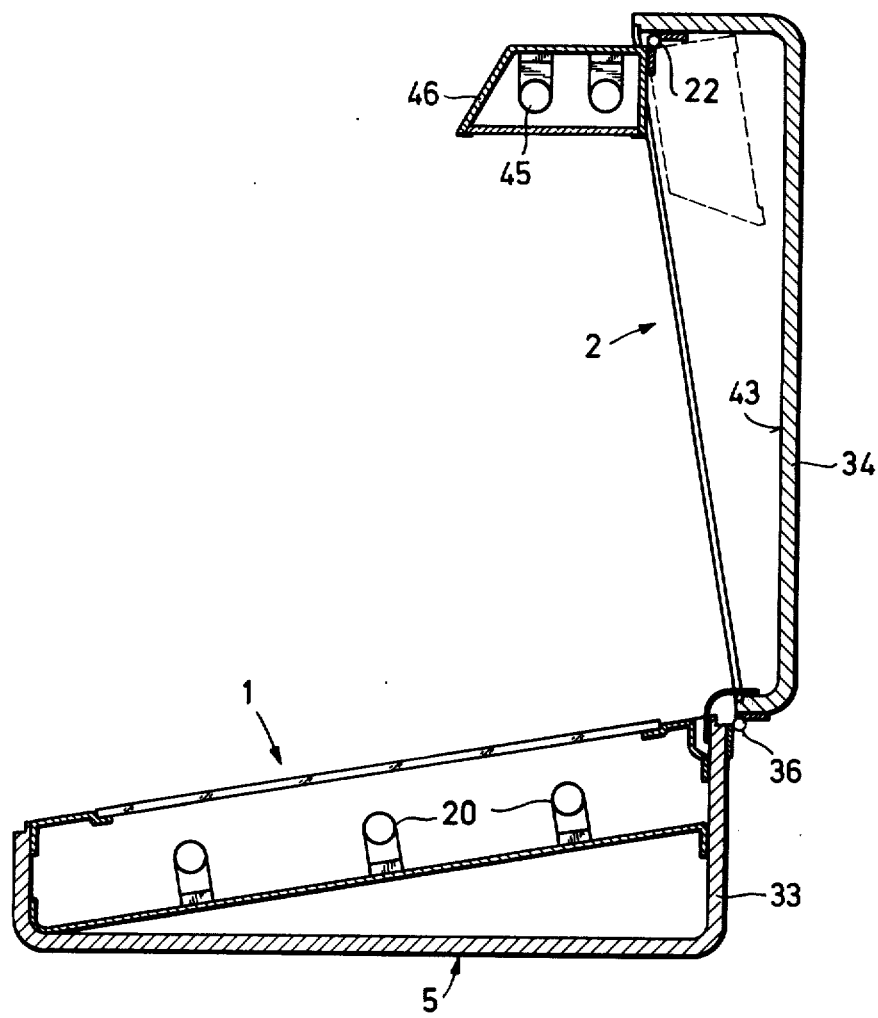
FIG. 3 schematically illustrates a second exemplary embodiment of the invention in a simplified sectional view.

Finally, in FIG. 3 there is shown a variant construction of the previously described viewing apparatus. The front viewing device 2, basically like that of FIG. 1, and which is arranged at the cover portion 34, instead of having a light source means which is arranged completely around the image supporting surface 43 as will be recalled was the case for the arrangement of FIGS. 1 and 2, here has an illumination device which is pivotably secured at the side of the cover portion or member 34 which is opposite the hinge means 36 for articulating the cover portion 34 with the floor or base portion 33 of the case-like housing or suitcase 5. This illumination device consists of a substantially vat- or trough-shaped reflector 46 in which there are arranged two luminescent or fluorescent tubes 45 or similar or equivalent light sources, and the reflector 46 is hingedly connected by the hinge means 22 with the cover 34 as above explained. The reflector 46 can be fixed in any random position through the agency of any fastening means suitable for this purpose and assumes the phantom line position when the suitcase cover portion or cover 34 is closed.

The invention of course is by no means limited to the previously described exemplary embodiments. Thus, for instance, the front viewing device need not always be directly articulated at the rear viewing device, rather there can also be provided for instance intermediate elements which themselves are hingedly connected with one another. What is important is only that the front viewing device and the rear viewing device can be brought into a defined mutual spatial arrangement or position which can be readily reproduced whenever desired.

The inventive apparatus permits of the simultaneous viewing of diapositives and front viewed pictures under standardized illumination conditions. It is small and convenient to handle, easily transportable and relatively inexpensive. Hence, it not only can be used for larger size business establishments, but also for small and medium size business concerns, even for customers and is economical to procure and work with.

While there is shown and described present preferred embodiments of the invention, it is to be distinctly understood that the invention is not limited thereto, but may be otherwise variously embodied and practiced within the scope of the following claims. Accordingly,

What is claimed is:

1. An apparatus for simultaneously viewing diapositives and front viewed images, especially transparent printed copies and prints produced therefrom, under standardized illumination conditions, comprising
    a. a case-like housing having a cover portion and a floor portion and means for hingedly interconnecting said two portions and for selectively fixing said two portions in an adjustable mutual angular position relative to one another;
    b. a rear viewing device being arranged in one of the housing's portions and incorporating a support for supporting a transparent image and light source means arranged behind said support; and
    c. a front viewing device being arranged in the other of the housing's portions and incorporating a support for supporting a front viewed image and light source means arranged forwardly of said support for the front viewed image;

ca. said light source means of said front viewing device surrounding said support of said front viewing device at all sides and comprising substantially tubular-shaped illumination means and trough-shaped reflector means, said illumination means being arranged at the edges of the support of said front viewing device and relative to the dimensions of said last-mentioned support at a small spacing above the same;

cb. said rear viewing device and said front viewing device being so arranged within the respective portions of the case-like housing that their respective supports substantially coincide when the case-like housing is closed.

2. The apparatus as defined in claim 1, wherein said reflector means comprises reflector elements having an essentially C-shaped configuration, said reflector elements having a first portion situated closer to the image support of said front viewing device and a second portion situated further removed therefrom, and wherein said closer situated first portion is more markedly curved than said second portion.

3. The apparatus as defined in claim 2, wherein said tubular-shaped illumination means is arranged at the more markedly curved first portion of the reflector element in such a manner that a portion of the light radiated in the direction of the image support of said front viewing device is screened.

* * * * *